(12) United States Patent
Kurmlavage et al.

(10) Patent No.: US 8,904,684 B1
(45) Date of Patent: Dec. 9, 2014

(54) ROLLER SIGN THIMBLE

(75) Inventors: Michael M. Kurmlavage, Lansdowne, PA (US); Jeremy Leeds-Frank, Plymouth, MA (US); Ronald McIntyre, Boyertown, PA (US)

(73) Assignee: Spirit Specialty Solutions, Inc., Broomall, PA (US)

( * ) Notice: Subject to any disclaimer, the term of this patent is extended or adjusted under 35 U.S.C. 154(b) by 23 days.

(21) Appl. No.: 13/506,335

(22) Filed: Apr. 12, 2012

(51) Int. Cl.
*G09F 11/02* (2006.01)

(52) U.S. Cl.
USPC ............... 40/506; 40/501; 40/660; 40/637

(58) Field of Classification Search
USPC ............... 40/506, 637, 660, 503; 219/469; 99/342, 377
See application file for complete search history.

(56) References Cited

U.S. PATENT DOCUMENTS

| | | | | |
|---|---|---|---|---|
| 1,211,737 A | * | 1/1917 | Martini | 116/308 |
| 4,337,104 A | * | 6/1982 | Lynn | 156/69 |
| 5,010,667 A | * | 4/1991 | Hassinger | 40/309 |
| 6,009,653 A | | 1/2000 | Harrington | |
| 6,089,483 A | * | 7/2000 | St-Laurent | 242/160.4 |
| 6,756,068 B1 | | 6/2004 | Kafentzis et al. | |
| 8,112,920 B2 | | 2/2012 | Fenton | |
| 2002/0166270 A1 | * | 11/2002 | Okyere | 40/309 |
| 2005/0144818 A1 | | 7/2005 | Zilberman | |
| 2010/0000135 A1 | * | 1/2010 | Fenton | 40/501 |

* cited by examiner

*Primary Examiner* — Casandra Davis
(74) *Attorney, Agent, or Firm* — Robert B. Famiglio; Famiglio & Associates

(57) ABSTRACT

A rolling information display apparatus and a method of displaying product information on a roller grill. A circular and symmetrical thimble device is configured to accept replaceable product information displays through the center of the device. The thimble acts as a collar for the product display information sign which is removable to allow for changing product information. The apparatus rolls along with the movement of the roller grill on which products are kept warmed in a typical retail display. The apparatus and the method of display disclosed allow for immediate labeling of products on a retail roller grill along with quick change capability to allow information to be changed in the thimble without the need to open up any apparatus or device.

4 Claims, 3 Drawing Sheets

ROLLER SIGN THIMBLE

BACKGROUND OF THE INVENTION

1. Field of the Invention

The invention relates generally to a rolling information display apparatus and a method of displaying product information used with a roller grill typically used to keep retail food products warm in the presentation process.

2. Description of the Related Art

A popular way to display food items at convenience stores and concession stands is to allow the product to both cook and remain warm on roller grill devices. Such roller grills heat the food items and are typical for use with hot dogs, sausages, and other retail food items which lend themselves to processing on roller grills given their shapes. Food items are typically placed on the heated rollers which are comprised of roller elements which rotate continuously and cause the food item to roll while absorbing heat from the roller surfaces. In view of regulations and cleanliness required in such retail food environments, such roller grills are made of nonstick materials, chromed or made of other high quality materials specifically suited to both convey heat efficiently and to remain clean and to be easy to keep in the required sanitary condition.

Such roller grills are frequently placed where customers can see the items being offered. Many establishments today label the available food items by using menu options mounted on the wall or the counter in which the retail food items are being offered. It is occasionally not obvious which labeling and pricing of a particular food item relates to which item is actually on a roller grill at any given time as available menu items may change throughout the day.

For requirements of cleanliness and isolation of food items from the general public as may be required by some health regulations, such roller grills are encased in glass cases to shield a product to prevent contamination of the food and to prevent customers from accidentally being burned by access to the grill directly. It would be desirable to have information about the food item on the roller grill immediately available and in the same location as the items being offered so there is no confusion as to the name of the item, the composition of the item or other information that consumers would need to know to make a selection. It is not possible or practical to actually label the food item itself. Therefore, having a sign that can be placed next to the rotating food item on the grill would provide clear and more precise information and is more desirable than the methods used today to label food items on the grill.

There have been information display devices which can be placed on a roller grill next to the item being offered. However, those devices found in the prior art are more complicated in their configuration and typically contain labeling information which must be placed in a clear cylinder and for which any information changes or price updates requires disassembling such prior art apparatus and placing new signs therein. Such devices also require constant cleaning so that the glass or clear plastic which seals the cylindrical sign device can be read by a consumer. Having normal cooking greases and oils along with discoloration from the high temperature of a roller grill is a specific disadvantage of such typical roller grill display information devices which has not yet been overcome. Also, with a device which has a larger contact area between it and the roller grill elements, food or other debris such as cooking oils contaminate the device more readily.

Accordingly, there is a need for a rolling information display device as well as a method for displaying product information used with a roller grill that does not require opaque or clear coverings for the product information, rotating with the device, to be read by a customer. Moreover, there is a need for having a lower priced, quick and simple information sign change device and method to reduce costs and allow frequent updates with less labor and expense involved in the process or in reconfiguring the rolling sign apparatus.

SUMMARY OF THE INVENTION

A rolling information display apparatus configured to rotate on a roller grill while holding an insertable product information sign contained in the apparatus and a method for display information in such an environment is disclosed. The apparatus is comprised of a round thimble-like collar having surfaces configured to roll when in contact with a roller grill element as used in retail food point of sale operations. In grilling operations, the device rotates in synchronization with the roller grill in close proximity to the food items on the grill which are also rotating with the grill and are available for sale. The display apparatus is configured of a medium which is removable and is inserted through the inside of the collar and rotates axially in synchronization with the collar. The information medium is heat resistant to avoid damage by contact or proximity of the rolling heated surfaces of the roller grill. The collar device is heat resistant and is of a material which does not scratch or degrade the rolling heated surfaces of the roller grill during contact between the apparatus and the roller grill.

The present invention provides a method of display of product and food information when used in conjunction with retail food products available on a rolling heated surface such as those used in conventional roller grills with retail food outlets. The method provides a means to display product information in close proximity to the product being offered to the public on sale by resting a round, partially hollow collar on the rolling surface. The collar contains a message flag or information which is inserted in the collar such that information is immediately available in close proximity to the food products being offered.

The apparatus is a cylindrical device which has a diminishing diameter across the axis of the device which is at a minimum at the center point of the axis such as to constrict the diameter of the thimble-like rolling collar through the center of the collar. With this constricted diameter through the center, the product sign information can be affixed by snapping in a product sign which also contains mating tabs to allow the sign to be firmly affixed through the axis of the collar. In a preferred embodiment, the collar also has detent slots to engage the tabs contained in the product information sign so as to assure fixed engagement between the product sign surface and the rolling collar device.

DETAILED DESCRIPTION OF INVENTION

Figure 3:
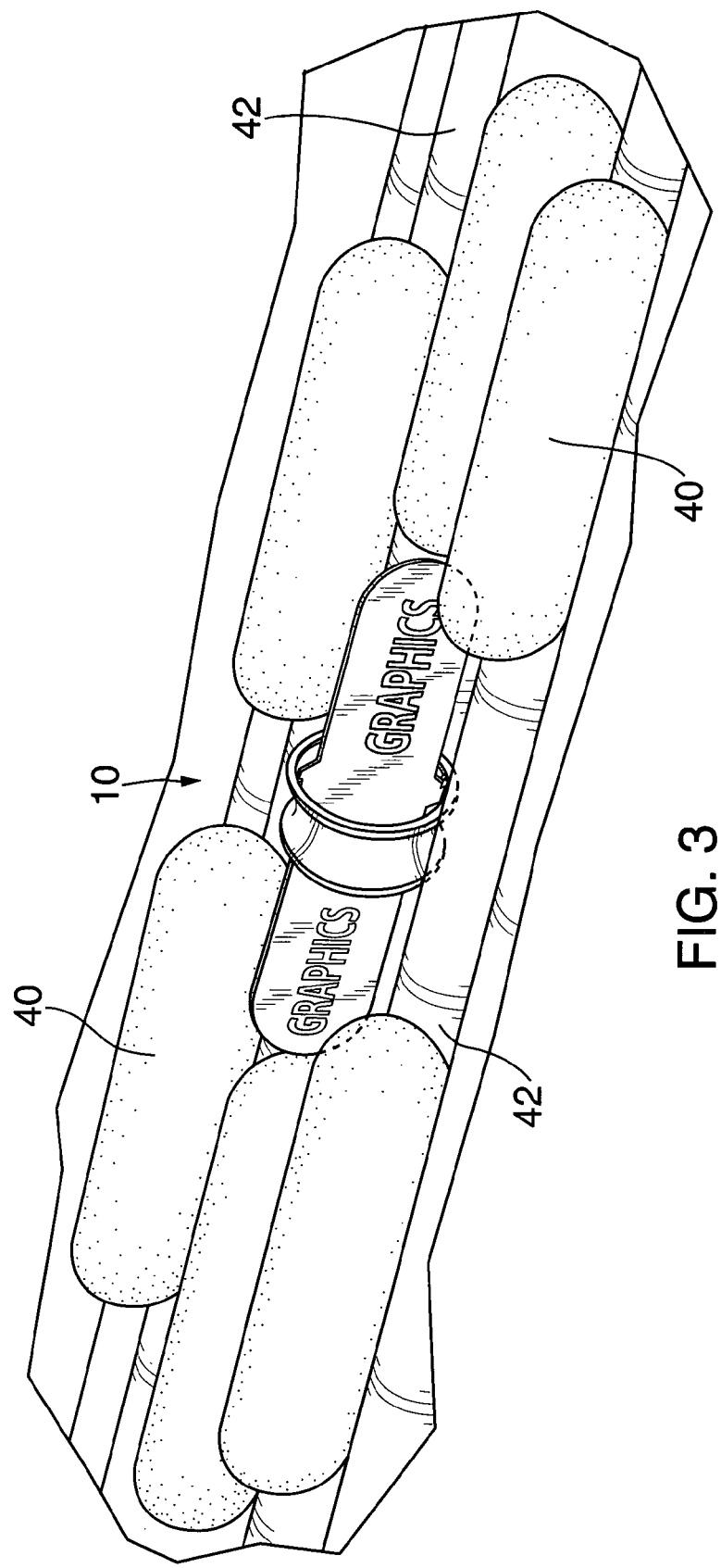
FIG. 3 is a perspective view illustrating the rolling information display apparatus disposed on a roller grill together with food items.

And now the invention will be described in detail with reference to the various drawings in which like numerals refer to like parts. Turning to FIG. 3, an embodiment of the invention is illustrated shown in use on a typical roller grill, which include food items 40 such as hot dogs or sausages. The roller grill elements 42 turn continuously heating and rolling food items 40 on such grills, the sign display allows consumers viewing the products to understand which products are lined up on which section of the roller grill. More than one rolling sign 10 can be placed on a given roller grill all spaced in a fashion to allow consumers to see the difference in products and prices for such products that may be located on one section of a grill versus another.

Figure 1:
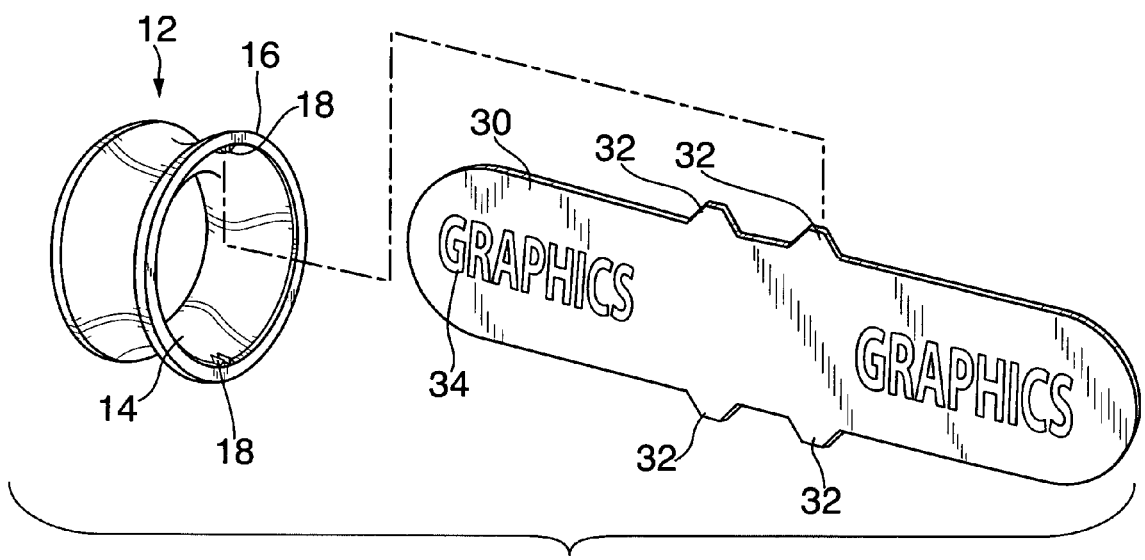
FIG. 1 is an exploded view of the components of the invention shown in FIG. 2.
Figure 2:
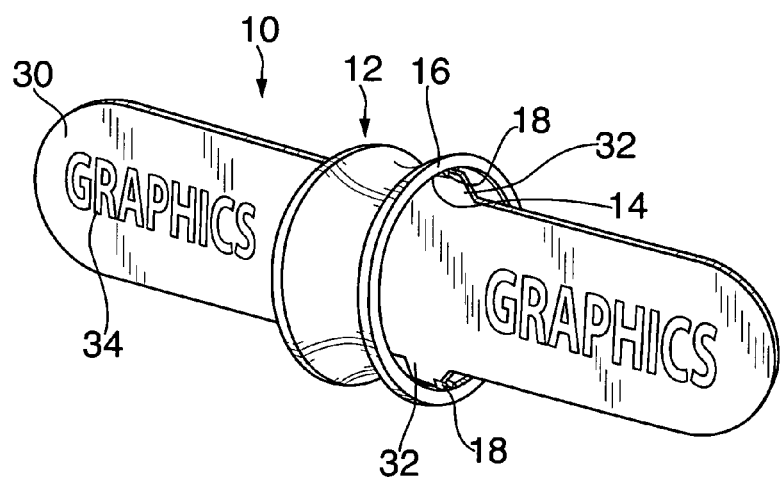
FIG. 2 is a pictorial view of a rolling information display configured in its assembled and operational configuration.

FIG. 2 is an illustration of rolling sign 10 with typical product label 30 inserted through thimble 12 which comprises the center structural element of the invention. Thimble 12 is a single piece roller-like component which has a hollow center allowing the insertion of product label 30 there through as shown in FIG. 2. Thimble 12 in the preferred embodiment is comprised of two thimble ridges 16 on the outer edges of the circumference of thimble 12 as illustrated.

Figure 4:
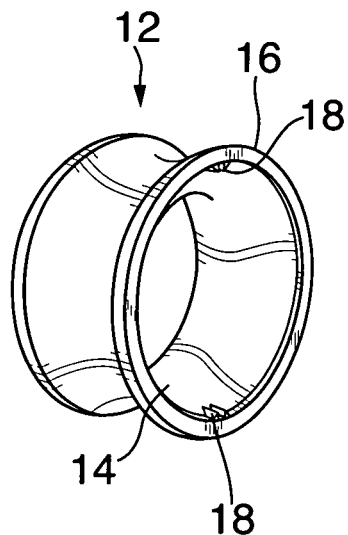
FIG. 4 is a side view illustrating the internal shape and configuration of the roller thimble with its integral collar.
Figure 5:
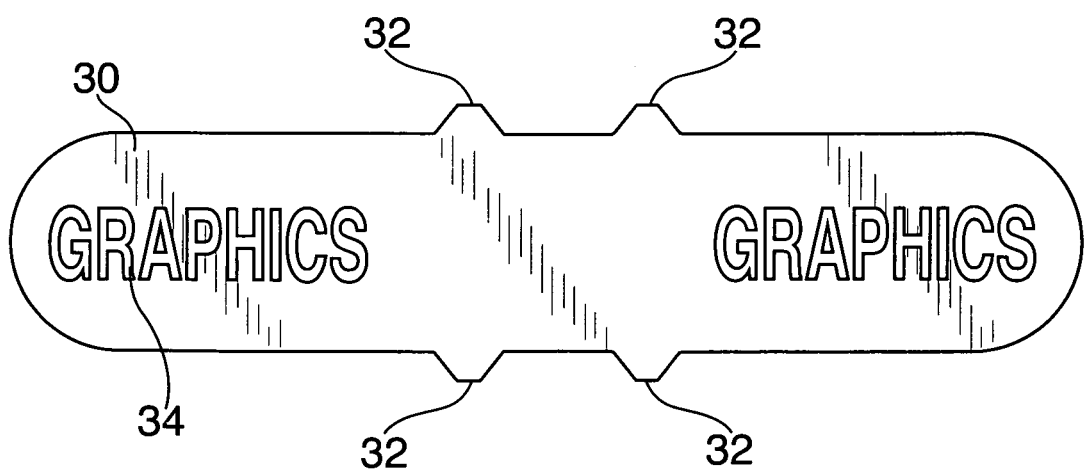
FIG. 5 is an illustration of the product information display shown separately, removed from the thimble shown in FIG. 4.

Viewing FIG. 4, a side view of thimble 12 is presented illustrating the thimble collar 14 in the center which causes product label 30 to grip more securely when label 30 is inserted through thimble 12. As also can be seen in FIG. 4, thimble ridge slots 18 are configured within the side of thimble ridges 16 such as to allow engagement with product label tabs 32. Product label 30 is of flexible design in the sense that product information can be printed on the label for a large variety of different products as may be desired by the user. For example, information surface 34 may illustrate in graphic form the brand name or style of the retail product on the roller grill being offered for sale. It is also possible to place the cost of the product or other information on surface 34 so that the consumer or customer may immediately appreciate the information they need when observing a product they may wish to purchase from a retail fast food location, a typical user of roller grills as described.

Product label 30 is typically of a high temperature flexible and inexpensive material so that it is resistant to high heat and to oils and grease that may be generated in the cooking of the typical retail products that are found on roller grills such as hot dogs or sausages of various sorts. High temperature, food-safe polymer materials with multi-layer substrates or polycarbonate materials can be used to manufacture label 30. Label 30, being stiff yet having some flexibility, is compressed slightly to insert it through the thimble collar 14 and will engage securely through friction with thimble 12 as can be seen in the various figures. In the preferred embodiment, a user will typically take thimble 12 as shown separately in FIG. 4 and insert label 30 through the center of collar 14 lining up label tabs 32 with corresponding thimble ridge slots 18. It can be appreciated therefore that upon engagement as shown in FIG. 2 in complete assembled form, product label 30 is held even more securely within thimble 12.

Thimble 12 uses thimble ridges 16 to engage the roller grill surfaces so that thimble 12 turns in unison with the products on the roller grill as can be seen by the typical installation shown in FIG. 3. Thimble ridges 16 act as the bearing surfaces which engage roller grill elements 42 such as to provide the friction applied to thimble 12 to cause rotation.

It is possible to configure thimble 12 in various shapes and still meet the object of the invention. For example, it can be appreciated that thimble 12 may be comprised of one continuous bearing surface such as if thimble ridges 16 are continuous across the surface of thimble 12 configured therefore as one large bearing surface for rotation upon engagement of the roller grill. However, the concave shape in FIG. 4 where thimble 12 has a constriction in the center between thimble ridges 16, forming thimble collar 14 which can engage the center of product label 30 is more easily formed and functions in a fashion to hold label 30 firmly between the sets of product label tabs 32. In fact, in the preferred embodiment should product label 30 become disengaged from thimble ridge slots 18 because of misalignment of product label tabs 32, the rolling sign still functions because of gripping compression and the requisite friction that is caused between thimble collar 14 and the product label 30.

The present invention presents a method of product labeling which is advantageous over what is used in the industry presently. The invention presented also allows a method of presenting product information in a rolling display for use with a roller grill which begins with the replaceable, insertable product label 30. The changing, refreshing or updating label information on surface 34 can be accomplished by simply reinserting a new or different product label 30 within the existing label 12 without the need to open a container, open seals, unscrew containers, clean any clear or visible protective surfaces or other actions which are presently found in other roller label devices that may be seen in the industry. Therefore, the invention also teaches a method for labeling retail product within or on a retail food roller grill apparatus. The method creates a product label for a product to be offered on a roller grill using labeling materials which are immune to the environmental hazards found on a roller grill, including heat and cooking oils and grease, inserting such a product label within a roller sign thimble 12 such as to allow affixing of product label 30 within roller thimble 12, and placing the rolling sign 10 just created on a roller grill to rotate with the retail food products being offered as illustrated on product label 30.

Although the invention has been described in accordance with the preferred embodiment, it will be appreciated by those skilled in the art that the application of the present invention is useful in a variety of configurations and designs not specifically described above. All such designs and applications are considered to be within the scope of the present disclosure, and the invention is applicable across a wide variety of applications. Such applications are considered within the scope and spirit of the present invention.

What is claimed is:

1. A rolling information display apparatus configured to rotate on a roller grill, the apparatus comprising:
    a tubular shaped thimble flared at each longitudinal end and having a substantially round opening through its longitudinal axis terminating in a substantially round opening at each end of said thimble;
    each said round opening comprised of a surface configured to roll in contact with the rolling surfaces of the roller grill; and
    an information medium removably positioned through the inside of the thimble such as to rotate axially with the thimble, said information medium being substantially centered within and protrudes outwardly from the thimble exposing the information medium outside of the thimble.

2. The apparatus of claim 1 wherein further said thimble and said information medium is sufficiently heat resistant to avoid being damaged by contact with the rolling, heated surfaces of the roller grill and said thimble of a diameter to seat between at least two rolling surfaces of the roller grill by contact with the surfaces of the roller grill.

3. The apparatus of claim 1 wherein further said thimble includes slotted fixtures positioned at opposite ends of the thimble's longitudinal axis within the interior circumference of the said round openings and said information medium includes tabs on its surface which are disposed to be removably engaged with and be affixed by the slotted fixtures to secure the information medium within the thimble as the thimble rotates.

4. A rolling information display apparatus configured to rotate on a roller grill, the apparatus comprising a thimble shaped substantially as a right circular frustum and a left circular frustum, each said frustum connected to each frustum's smaller radius with the larger radius of each frustum disposed to rest by contact on the rolling surfaces of the roller grill;

an information medium removably positioned through the inside of the thimble such as to rotate axially with the thimble, said information medium being substantially centered within and protrudes outwardly from the thimble exposing the information medium outside of the thimble, said thimble includes slotted fixtures positioned at opposite ends of the thimble's longitudinal axis within the interior circumference of the said round openings and said information medium includes tabs on its surface which are disposed to be removably engaged with and be affixed by the slotted fixtures to secure the information medium within the thimble as the thimble rotates.

\* \* \* \* \*